United States Patent
Fukushima (10) Patent No.: US 6,941,781 B2
(45) Date of Patent: Sep. 13, 2005

(54) ELECTRICALLY-OPERATED STEERING LOCK DEVICE

(75) Inventor: Keisuke Fukushima, Aki-gun (JP)

(73) Assignee: U-Shin Ltd., Tokyo (JP)

( * ) Notice: Subject to any disclaimer, the term of this patent is extended or adjusted under 35 U.S.C. 154(b) by 0 days.

(21) Appl. No.: 10/677,230

(22) Filed: Oct. 3, 2003

(65) Prior Publication Data

US 2004/0069026 A1 Apr. 15, 2004

(30) Foreign Application Priority Data

Oct. 4, 2002 (JP) ........................................ 2002-291740

(51) Int. Cl.[7] ............................................. E05B 65/12
(52) U.S. Cl. ........................................... 70/252; 70/186
(58) Field of Search ............................. 70/182–186, 252

(56) References Cited

U.S. PATENT DOCUMENTS

| | | | | | |
|---|---|---|---|---|---|
| 2,616,274 | A | * | 11/1952 | Landrum ...................... | 464/57 |
| 3,673,829 | A | * | 7/1972 | Mizuno ........................ | 70/252 |
| 4,907,427 | A | * | 3/1990 | Armstrong ................... | 70/252 |
| 6,053,067 | A | * | 4/2000 | Garnault et al. .............. | 70/184 |
| 6,233,986 | B1 | * | 5/2001 | Suzuki et al. ................. | 70/186 |
| 6,234,039 | B1 | * | 5/2001 | Garnault et al. .............. | 70/184 |
| 6,354,117 | B1 | * | 3/2002 | Canard ........................ | 70/186 |
| 6,539,756 | B2 | * | 4/2003 | Bartels et al. ................ | 70/252 |
| 6,543,262 | B2 | * | 4/2003 | Limburg et al. .............. | 70/186 |
| 6,786,069 | B2 | * | 9/2004 | Ochi ........................... | 70/252 |
| 6,862,907 | B2 | * | 3/2005 | Hayashi et al. ............... | 70/186 |

FOREIGN PATENT DOCUMENTS

JP 2002-234419 8/2002

* cited by examiner

*Primary Examiner*—Daniel P. Stodola
*Assistant Examiner*—Christopher Boswell
(74) *Attorney, Agent, or Firm*—Wenderoth, Lind & Ponack L.L.P (57) ABSTRACT

An electrically-operated steering lock device includes a protrusion blocking mechanism that blocks protrusion of a lock shaft of a solenoid or the like, and is arranged to prevent malfunctions of the protrusion blocking mechanism even if current is passed through the protrusion blocking mechanism during running of the vehicle. A lock shaft is movable between a protrusion position where a steering shaft is locked and a retracted position where the steering shaft is unlocked, and a lock shaft moving mechanism is coupled to an electric motor and serves to move the lock shaft. The protrusion blocking mechanism is electrically driven and, when the lock shaft is placed at a retracted position, engages with an engagement portion formed in the lock shaft to block protrusion of the lock shaft. A holding device holds the protrusion blocking mechanism in a position where protrusion of the lock shaft is blocked.

10 Claims, 6 Drawing Sheets

ELECTRICALLY-OPERATED STEERING LOCK DEVICE

BACKGROUND OF THE INVENTION

The present invention relates to an electrically-operated steering lock device which is prevented from locking the steering shaft even if an electrically-operated member has malfunctioned due to noise or the like.

A conventional electrically-operated steering lock device, as disclosed in, for example, Japanese Patent Laid-Open Publication No. 2002-234419, is so designed that a lock shaft is driven by a plate cam coupled to an electric motor so that the lock shaft is protruded toward a steering shaft so as to be engaged with the steering shaft, and thus locked. Further, with an engagement recessed portion formed in the plate cam, a plunger of a solenoid is engaged with the engagement recessed portion so that even if the electric motor malfunctions, the lock shaft is prevented from popping out by keeping the plate cam from rotating with a hold by the plunger.

However, in such electrically-operated steering lock device, there has been a problem that when the solenoid and the electric motor are simultaneously driven due to noise or the like during running of a vehicle, the solenoid may pull in the plunger so that its engagement with the plate cam is released, where at this timing of releasing, the electric motor rotates to make the lock shaft protrude toward the steering shaft, thus locking the steering shaft.

SUMMARY OF THE INVENTION

The present invention having been accomplished in view of these and other problems of the prior art, an object of the invention is to provide an electrically-operated steering lock device which keeps the lock shaft from protruding even if electric currents flow through the electric motor and the solenoid at the same time by an arrangement that a protrusion blocking means for blocking the lock shaft of a solenoid or the like is prevented from malfunctioning even if an electric current is passed through the protrusion blocking means during running.

As a solution to the above-described issues, the present invention provides an electrically-operated steering lock device having a lock shaft which is movable between a protruded position where a steering shaft is locked and a retracted position where the steering shaft is unlocked, and lock shaft moving device coupled to an electric motor and serving to move the lock shaft, the electrically-operated steering lock device further comprising: a protrusion blocking device which is electrically driven and which, when the lock shaft is placed in the retracted position, engages with a receiving portion formed in the lock shaft to block protrusion of the lock shaft; and holding part for holding the protrusion blocking device in a position where protrusion of the lock shaft is blocked.

According to this invention, by virtue of the doubled provision of the protrusion blocking device which, when the lock shaft is placed in the retracted position, engages with the receiving portion formed in the lock shaft to block protrusion of the lock shaft, as well as of the holding part for holding the protrusion blocking device in the position where protrusion of the lock shaft is blocked, even if electric currents have flowed simultaneously through both the electric motor and the protrusion blocking device due to noise or the like so that the protrusion blocking device and the lock shaft moving means are driven, the protrusion blocking device is held by the holding means, and thus never activated. Thus, the possibility that the lock shaft may erroneously be protruded to lock the steering shaft can be eliminated reliably.

Also, the lock shaft moving device may be implemented by a lock shaft moving device comprising a spring for biasing the lock shaft to the protrusion position, and an electrically-operated member which is to be engaged with an engagement recessed portion formed in the lock shaft to move the lock shaft to the retracted position.

According to this aspect of the invention, the protrusion blocking device for blocking the protrusion of the lock shaft is not directly subject to the rotational force of the electrically-operated member, but only subject to the load of the spring that biases the lock shaft to the protrusion position. Therefore, the load applied to the protrusion blocking device is very small, so that the protrusion blocking device can be made smaller in strength proportionally.

Further, the protrusion blocking device may be implemented by a solenoid having a plunger which is to be engaged with the engagement portion formed in the lock shaft.

According to this aspect of the invention, since the plunger of the solenoid is only engaged with the engagement portion as it is, mis-operations of the lock shaft can be prevented with quite a simple structure.

Furthermore, the lock shaft moving device may be implemented by a lock shaft moving device which enables the lock shaft to move to the protruded position when the electric motor is rotated forward, and enables the lock shaft to move to the retracted position when the electric motor is rotated in reverse, and the holding part is an engagement portion formed in the lock shaft, and wherein, in a state that the engagement with the engagement portion has been released by reverse rotation of the electric motor, the lock shaft is allowed to protrude by forward rotation of the electric motor.

According to this aspect of the invention, in order to allow the lock shaft to be protruded, the electric motor, before being rotated forward, needs to be once rotated in reverse and, in that state, the engagement between the lock shaft and the holding part needs to be released. Thereby, mis-operations of the lock shaft can be prevented more reliably.

BRIEF DESCRIPTION OF THE DRAWINGS

The present invention will be further described with reference to the accompanying drawings wherein like reference numerals refer to like parts in the several views, and wherein.

DETAILED DESCRIPTION OF THE PREFERRED EMBODIMENTS

Figure 1:
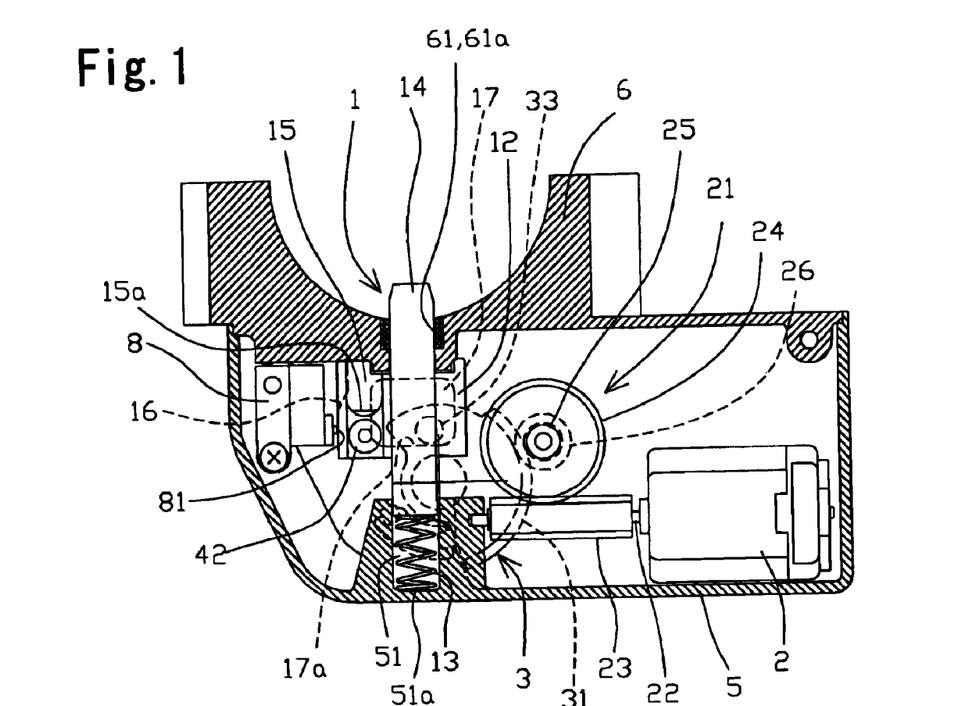
FIG. 1 is a sectional top view showing an electrically-operated steering lock device according to the embodiment of the present invention.
Figure 2:
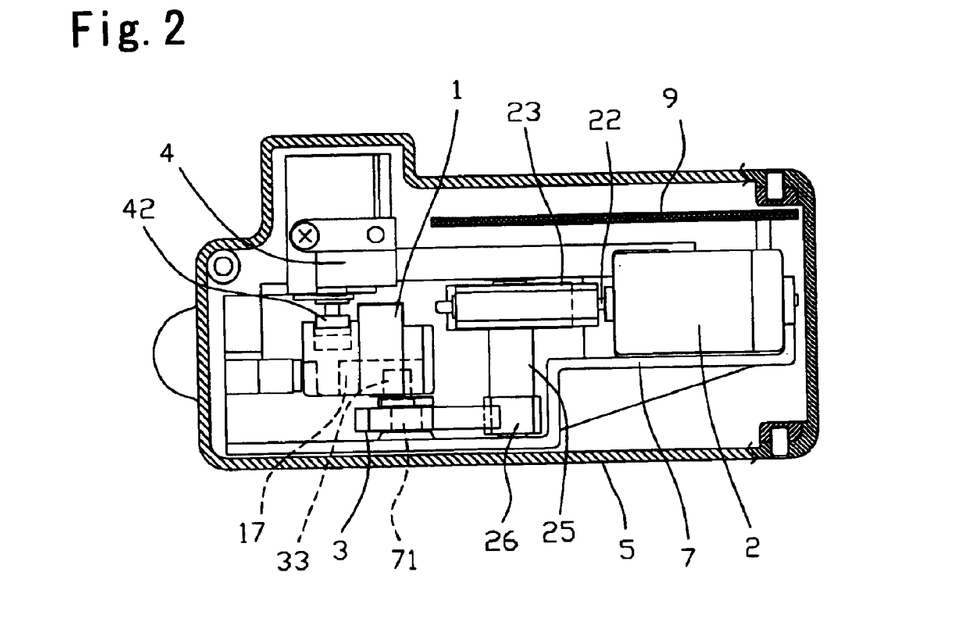
FIG. 2 is a sectional front view of the electrically-operated steering lock device according to an embodiment of the present invention.

FIGS. 1 and 2 show an electrically-operated steering lock device according to the present invention. This electrically-operated steering lock device is so constructed that a lock shaft 1, an electric motor 2, a final reduction gear 3 which is an electrically-operated member, and a solenoid 4 which is a protrusion blocking means are all arranged within a housing 5, where the housing 5 is fixed to a base portion 6 so that all of the members are integrated together into one unit. It is noted that the electric motor 2 and the final reduction gear 3 are disposed within the housing 5 as they are fitted and held to a motor bracket 7.

Figure 3A:
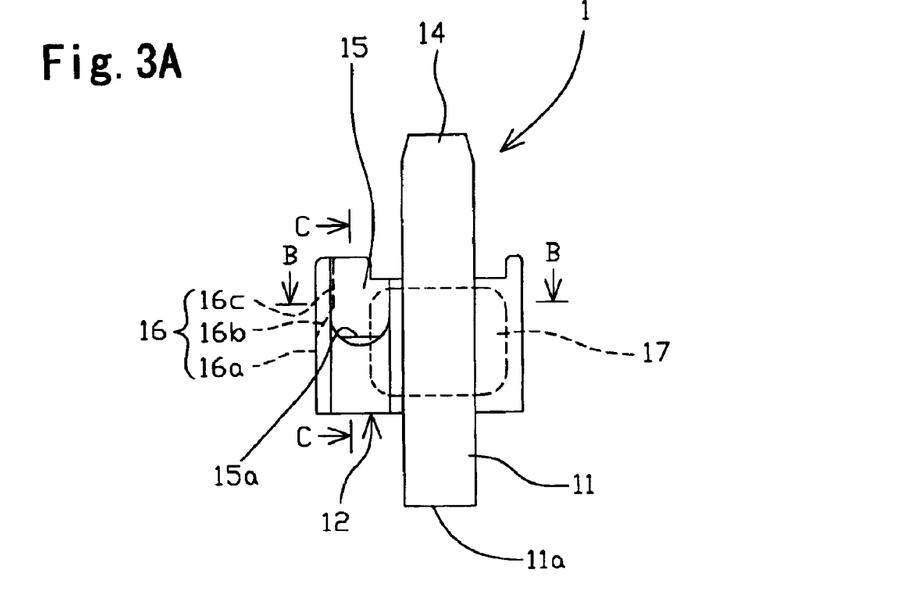
FIG. 3A is a plan view showing a lock plate of FIG. 1.
Figure 3B:
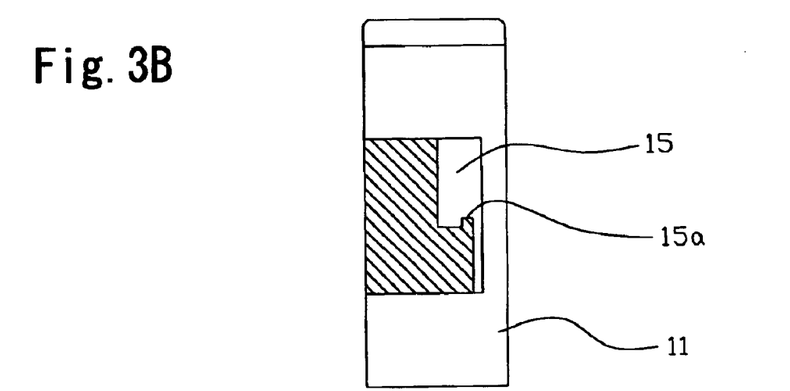
FIG. 3B is a sectional view taken along the line B—B of FIG. 3A.
Figure 3C:
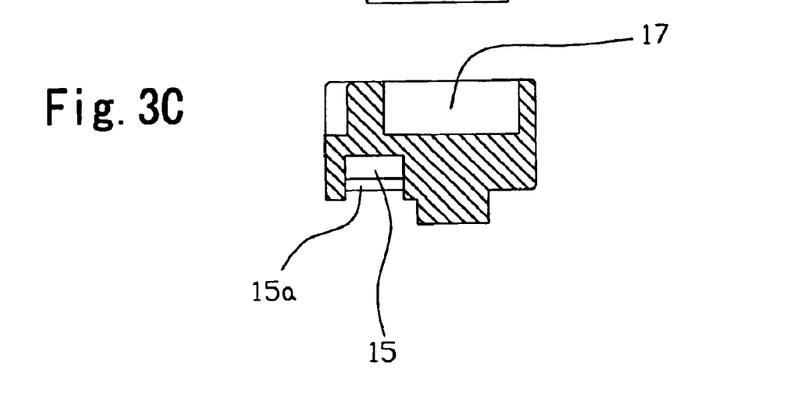
FIG. 3C is a sectional view taken along the line C—C of FIG. 3A.

As shown in FIGS. 3A to 3C, the lock shaft 1 is composed of a body portion 11 and a wing portion 12 extending right and left below the body portion 11. A rear end face 11a of the body portion 11 is inserted into a fitting recess portion 51 (shown in FIG. 1) provided in a housing 5 in a state that one end of a spring 13 (shown in FIG. 1) accommodated in the fitting recess portion 51 is kept in contact with the rear end face 11a. The other end of the spring 13 is in contact with a bottom portion 51a of the fitting recess portion 51. The spring 13 acts to bias the lock shaft 1 in its protruding direction. The spring 13 and the final reduction gear 3 constitute a lock shaft moving means.

A forward portion of the body portion 11 forms a lock portion 14. When the lock shaft 1 is biased by the spring 13 so as to be moved in its protruding direction (the state shown in FIG. 1), the lock portion 14 protrudes outward from an opening portion 61 of the base portion 6. The protruding lock portion 14 is engaged with a receiving portion of a steering shaft (not shown) of the vehicle, thereby locking the steering shaft. In addition, a sliding plate 61a for smoothing the sliding movement of the lock shaft 1 is fixed to the opening portion 61. This sliding plate 61a is formed of a hard metal material so that the opening portion 61 is never deformed even if a strong load is applied to the lock shaft 1. This is quite effective for the case where the base portion 6 is molded of a relatively soft metal material such as aluminum-pressure die casting or zinc die casting or the like.

Also, a receiving recess 15 for receiving a plunger 42 of the solenoid 4 is formed in an upper surface of the wing portion 12 on the left side of the body portion 11. In this receiving recess 15 is formed an engagement portion 15a as a holding means which is to be engaged with the plunger 42 to thereby restrict movement of the plunger 42 toward the upward side (toward the front side of the drawing sheet in FIG. 3A). On the left side face of the wing portion 12 is formed a sliding surface 16 which activates a lock shaft switch 8. This sliding surface 16 is composed of a convex portion 16a, a slope surface 16b and a concave portion 16c. Further, a generally rectangular-shaped recessed portion 17 is formed in a central lower surface of the wing portion 12.

The electric motor 2, which is powered by unshown lines laid in the housing 5, is rotated in forward and reverse directions by an internal control circuit 9. Also, the electric motor 2, as shown in FIGS. 1 and 2, acts to rotate the final reduction gear 3 clockwise and counterclockwise in FIG. 1 via a rotating mechanism 21. This rotating mechanism 21 is made up of a worm 23 fitted to a driving shaft 22 of the electric motor 2, a large-diameter worm gear 24 to be meshed with the worm 23, and a coaxial small-diameter gear 26 provided integrally with a rotating shaft 25 of the large-diameter worm gear 24. The small-diameter gear 26 is to be meshed with a segment gear 31 formed on the outer periphery of the final reduction gear 3. As a result of this, when the electric motor 2 is rotated in the forward direction, the small-diameter gear 26 is rotated in the reverse direction, i.e. counterclockwise in FIG. 1. As the small-diameter gear 26 is rotated counterclockwise in FIG. 1, the final reduction gear 3 is rotated clockwise. Conversely, as the electric motor 2 is rotated in reverse, the small-diameter gear 26 is rotated clockwise in FIG. 1, so that the final reduction gear 3 is rotated in reverse, i.e. counterclockwise in FIG. 1.

Figure 4A:
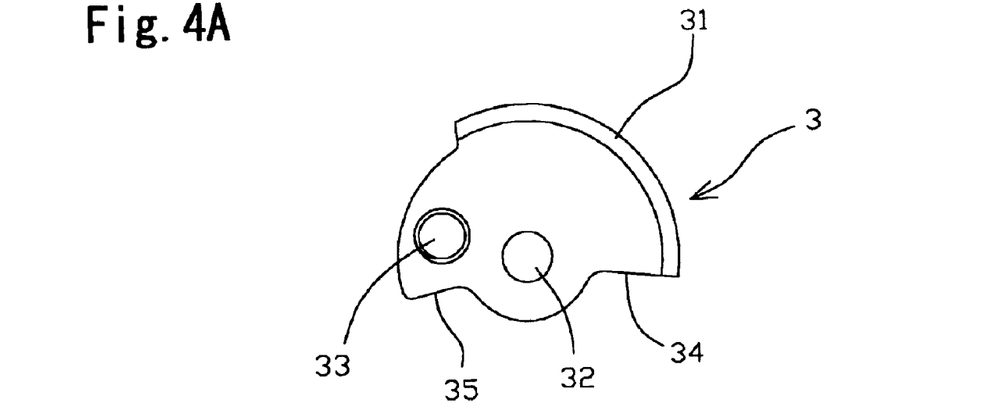
FIG. 4A is a plan view showing a final reduction gear of FIG. 1.
Figure 4B:
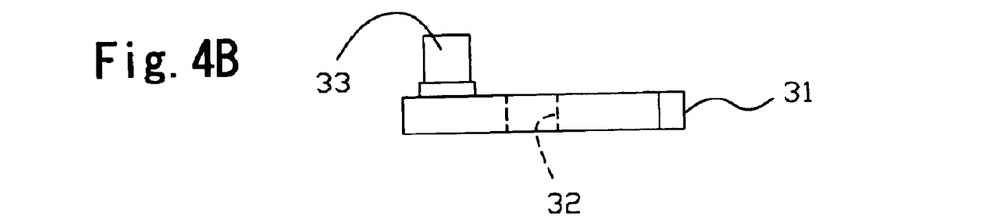
FIG. 4B is a front view of the final reduction gear of FIG. 4A.

The final reduction gear 3, which is formed into a generally fan shape with the segment gear 31 formed on its outer periphery as shown in FIGS. 4A and 4B, has a rotational hole 32 formed at a central portion, and is rotatably fitted and held to a gear shaft 71 protrusively provided on the motor bracket 7 so as to be rotatable about the gear shaft 71. Further, at an outer-peripheral edge of the top surface of the final reduction gear 3 is provided a cylindrical-shaped engagement protrusion 33 which protrudes in a direction parallel to the gear shaft 71.

A tip end portion of the engagement protrusion 33 is extended into the recessed portion 17 of the lock shaft 1. The engagement protrusion 33 makes contact with an inner wall 17a of the recessed portion 17 to press the lock shaft 1 in its retracting direction against the biasing force of the spring 13.

Figure 5:
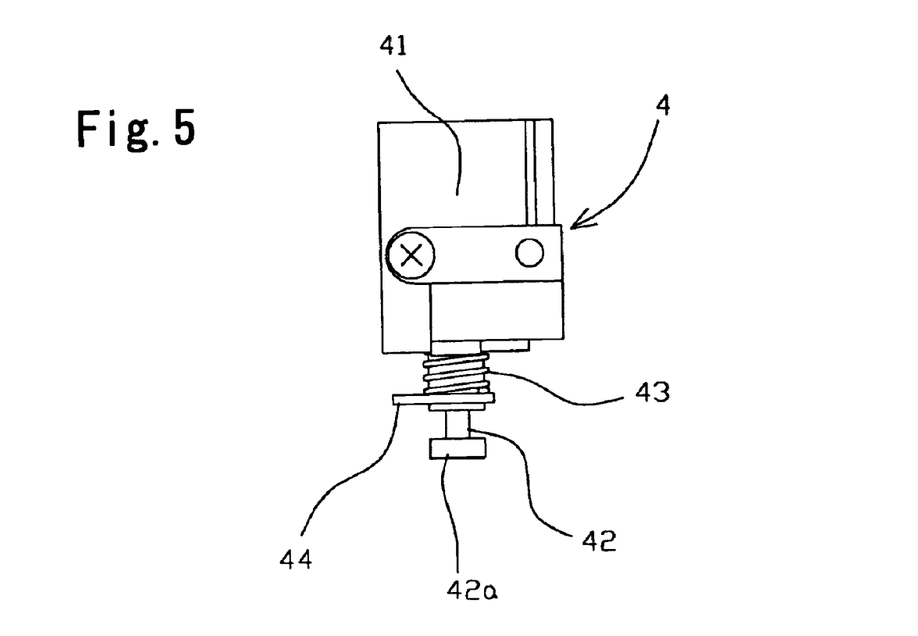
FIG. 5 is a front view of the solenoid of FIG. 1.

The solenoid 4, as shown in FIG. 5, includes a main body 41 in which an electromagnetic coil and the like are accommodated therein, a plunger 42 with a flange portion 42a formed thereon, a spring 43 for biasing the plunger 42 in the protruding direction, and a movable plate 44 which is in contact with one end of the spring 43 and fixed to the plunger 42. This movable plate 44 turns on and off a solenoid switch (not shown). Then, the plunger 42 is normally placed at a protruding position by the biasing force of the spring 43, but when a current conduction is given to the solenoid 4, the plunger 42 withdraws toward the main body 41 side against the biasing force of the spring 43.

The lock shaft switch 8 is a switch for detecting the position of the lock shaft 1, and when the lock shaft 1 is protruded, the lock shaft switch 8 is pushed in by a movable piece 81 being positioned at the convex portion 16a of the sliding surface 16, where the lock shaft switch 8 is turned on. When the lock shaft 1 is placed at its retracted position, the lock shaft switch 8 is protruded into the concave portion 16c, whereby the lock shaft switch 8 is turned off.

Next, operation of the electrically-operated steering lock device having the above constitution is described.

Figure 6A:
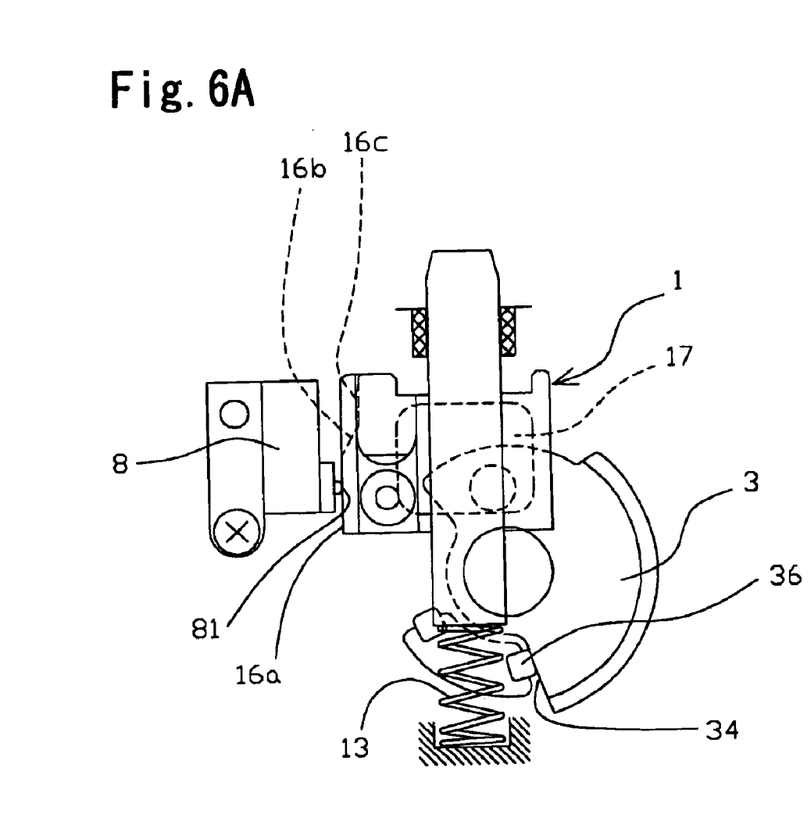
FIG. 6A is a plan view of a main part showing a lock shaft of the electrically-operated steering lock device in a protruding state.
Figure 6B:
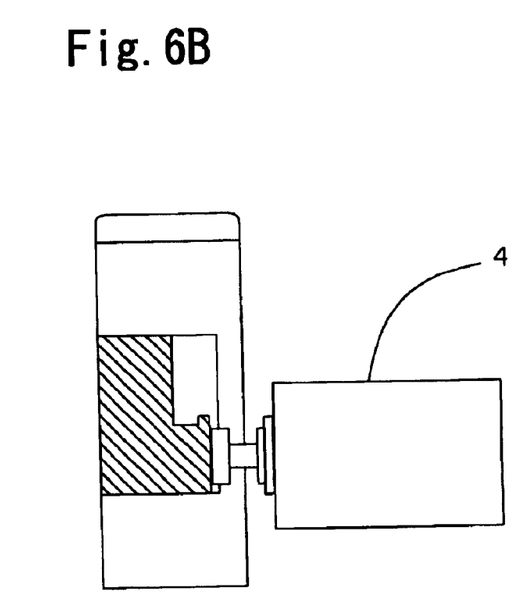
FIG. 6B is a left-side-face sectional view showing the relationship between the lock shaft and the solenoid in the state of FIG. 6A.

FIG. 1 and FIGS. 6A and 6B show a state that the lock shaft 1 of the electrically-operated steering lock device is in a lock position while protruding from the opening portion 61 in a stopped automobile. In this state, the final reduction gear 3 is at a clockwise-rotated position with its one end face 34 in contact with one stopper 36 formed from an elastic material. Also, the movable piece 81 of the lock shaft switch 8, which is placed at the convex portion 16a of the sliding surface 16 formed on the left side face of the wing portion 12 of the lock shaft 1, has plunged into the switch, thus placing the lock shaft switch 8 in an ON state. Meanwhile, the solenoid 4 is in an OFF state, and the flange portion 42a of the plunger 42 is kept in contact with the top of a protruding surface 15b of the receiving portion 15 formed on the left-side upper surface of the wing portion 12 of the lock shaft 1 by the biasing force of the spring 43. In this state, the plunger 42 is in the pushed-in position, and a solenoid switch (not shown) operable in response to the movable plate 44 is in the OFF state.

Upon input of a signal for driving the engine in this state, a signal for rotating the electric motor 2 in reverse is delivered from the internal control circuit 9, and with a current fed to the electric motor 2, the electric motor 2 is rotated in reverse, by which the final reduction gear 3 is rotated counterclockwise via the rotating mechanism 21.

When the final reduction gear 3 is rotated counterclockwise, the engagement protrusion 33 presses an inner surface 17a of the recessed portion 17 of the lock shaft 1 to move the lock shaft 1 in its retracting direction against the biasing force of the spring 13. When this occurs, the lock portion 14 of the lock shaft 1 separates away from the receiving portion of the steering shaft (not shown) of the vehicle. As a result, the engagement of the steering shaft is released, by which the steering shaft is unlocked.

Figure 7A:
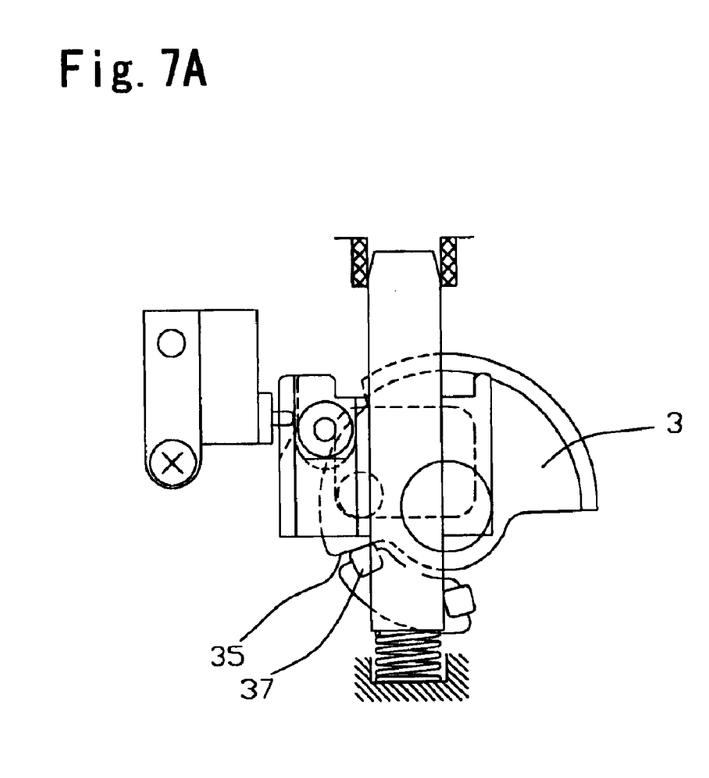
FIG. 7A is a plan view of a main part showing the lock shaft of the electrically-operated steering lock device in a fully retracted state.
Figure 7B:
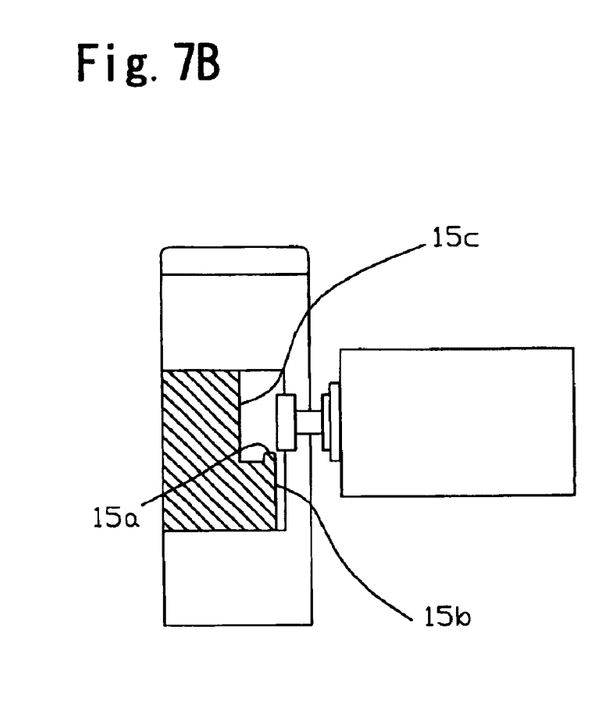
FIG. 7B is a left-side-face sectional view showing the relationship between the lock shaft and the solenoid in the state of FIG. 7A.

Then, when the final reduction gear 3 is rotated up to a position shown in FIG. 7A, i.e., a position where the other end face 35 of the final reduction gear 3 makes contact with the other stopper 37, the flange portion 42a of the plunger 42 of the solenoid 4 goes beyond the engagement portion 15a from on the protruding surface 15b of the receiving portion 15, plunging to a recess surface 15c from the position of FIG. 7B by the biasing force of the spring 43. In this case, the solenoid switch is placed in an ON state.

As to the lock shaft switch 8, the movable piece 81 slides on the sliding surface 16, moving from the convex portion 16a through the slope surface 16b to the concave portion 16c, thus protruded, with the result that the lock shaft switch 8 is turned off.

The internal control circuit 9, upon reception of an OFF signal for the lock shaft switch 8 and an ON signal for the solenoid switch, outputs a signal to rotate the electric motor 2 a little forward. As a result, with a current fed to the electric motor 2, the electric motor 2 is rotated forward, so that the final reduction gear 3 is rotated a little clockwise via the rotating mechanism 21, where the lock shaft 1 is moved a little in the protruding direction by the biasing force of the spring 13.

Figure 8A:
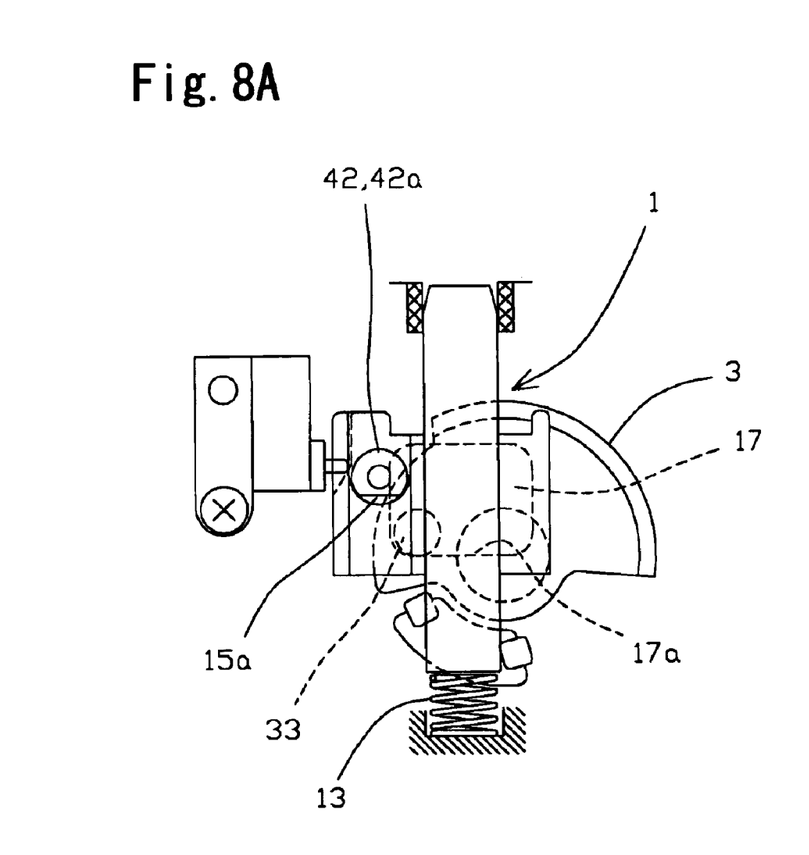
FIG. 8A is a plan view of a main part showing a state in which the lock shaft and the solenoid of the electrically-operated steering lock device are engaged with each other.
Figure 8B:
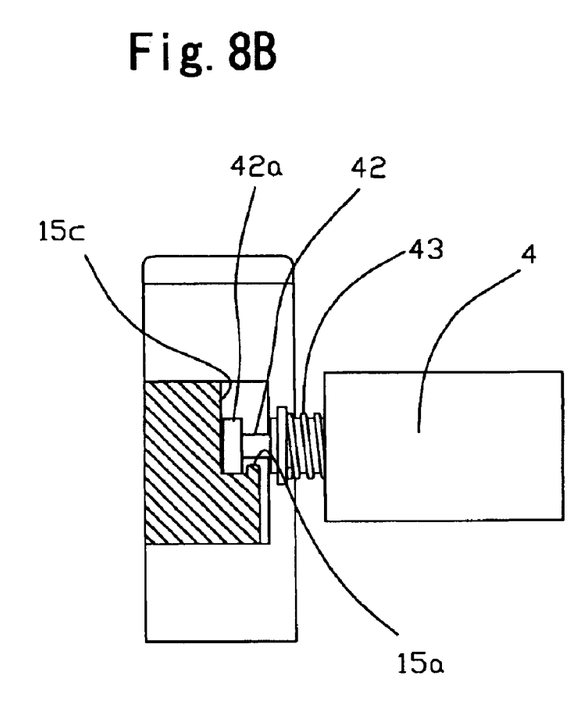
FIG. 8B is a left-side-face sectional view showing the relationship between the lock shaft and the solenoid in the state of FIG. 8A.

Then, as shown in FIGS. 8A and 8B, the flange portion 42a of the plunger 42 of the solenoid 4 is engaged with the engagement portion 15a while kept in contact with the recess surface 15c of the receiving portion 15.

In this state, the lock shaft 1 never moves and protrudes in its protruding direction due to restriction by the plunger 42 of the solenoid 4 even if a force for moving the lock shaft 1 in the protruding direction is exerted by the biasing force of the spring 13 in the event that, for example, noise has entered into the internal control circuit 9, from which a signal for rotating forward the electric motor 2 is issued so that the electric motor 2 is rotated forward, causing the final reduction gear 3 to rotate clockwise via the rotating mechanism 21, and further causing the engagement protrusion 33 to separate from the inner surface 17a of the recessed portion 17 of the lock shaft 1. In addition, the plunger 42 is subject only to the biasing force of the spring 13, and not to driving by the electric motor 2. Therefore, the plunger 42 can be formed into a small-size plunger with low strength.

Also, even in the event that special noise has entered the internal control circuit 9, from which a signal for rotating forward the electric motor 2 and a signal for activating the solenoid 4 are issued simultaneously, the plunger 42, even with an attempt for attracting the plunger 42, never moves by virtue of the engagement of the flange portion 42a with the engagement portion 15a of the lock shaft 1. Further, since the lock shaft 1 is biased toward the protruding direction by the spring 13, the engaging force between the flange portion 42a of the plunger 42 and the engagement portion 15a of the lock shaft 1 becomes proportionally, allowing the plunger 42 to be held securely. Thus, the lock shaft 1 is never allowed to protrude.

In the event that a signal for rotating the electric motor 2 in reverse and a signal for activating the solenoid 4 have been issued simultaneously from the internal control circuit 9, the plunger 42 is attracted, but the lock shaft 1 has been moved in the retracting direction and therefore never protrudes. Then, upon a cease of the abnormality signal, the solenoid 4 is stopped from activation, the plunger 42 is plunged into the receiving portion 15 by the biasing force of the spring 43, thus being engaged with the engagement portion 15a while kept in contact with the recess surface 15c.

As shown above, even if noise has entered the internal control circuit 9 during the running so that a signal for rotating the electric motor 2 forward and a signal for driving the solenoid 4 are issued from the internal control circuit 9, the plunger 42 is never moved in the protruding direction, thereby providing high safety.

This electrically-operated steering lock device is so designed as to be locked when the driver has come out of the vehicle with the engine stopped.

More specifically, when a vehicle-side control circuit (not shown) has received a signal issued to show that the driver has come out with the vehicle stopped and the engine off under the conditions that the lock shaft switch 8 is off and the solenoid switch is on, a signal showing that the driver has gone away from the vehicle is issued from the vehicle-side control circuit to the internal control circuit 9, while a signal for rotating the electric motor 2 in reverse is issued from the internal control circuit 9, where the lock shaft 1 moves from the position shown in FIG. 8A to the position shown in FIG. 7A. Subsequently, a signal for driving the solenoid 4 is issued, causing the solenoid 4 to be driven, so that the plunger 42 is attracted up to a position slightly over the position shown in FIG. 7A against the biasing force of the spring 43. Then, with the solenoid switch turned off, a signal for rotating the electric motor 2 forward is issued from the internal control circuit 9, causing the electric motor 2 to be rotated forward so that the final reduction gear 3 is rotated clockwise via the rotating mechanism 21. Then, the lock shaft 1 is moved in the protruding direction by the biasing force of the spring 13, where the lock portion 14 of the lock shaft 1 is protruded from the outer frame of the housing 5 so as to be engaged with the receiving portion of the steering shaft of the vehicle, causing the lock shaft switch 8 to be turned on. With the lock shaft switch 8 on, the conduction to the solenoid 4 is interrupted, and the flange portion 42a of the plunger 42 comes into contact with the top of the protruding surface 15b of the receiving portion 15 formed on the left-side upper surface of the wing portion 12 of the lock shaft 1 by the biasing force of the spring 43, resulting in an OFF state. As a result, the electrically-operated steering lock device is placed in a locked state as shown in FIG. 1 and FIGS. 6A and 6B.

In the above-described embodiment, the lock shaft 1 is moved from the position shown in FIG. 8A to the position shown in FIG. 7A before the solenoid 4 is driven. However, it is allowable that they may be driven simultaneously. In this case, since the conduction may be applied at the same timing for both, the circuit construction becomes simpler proportionally.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An electrically-operated steering lock device having a lock shaft which is movable between a protruded position where a steering shaft is locked and a retracted position where the steering shaft is unlocked, and a lock shaft moving device coupled to an electric locking motor and serving to move said lock shaft, the electrically-operated steering lock device further comprising: a protrusion blocking device which, when said lock shaft is placed in a retracted position, engages with a receiving portion formed in said lock shaft to block said protrusion of said lock shaft; and a holding part for holding said protrusion blocking device in a position where protrusion of said lock shaft is blocked;

wherein said protrusion blocking device comprises a protrusion blocking plunger movable between an extended position in which said plunger is engageable with said receiving portion and a retracted position in which said plunger is withdrawn from said receiving portion;

wherein said protrusion blocking device further comprises an electric safety motor which is operable, upon activation, to perform a plunger withdrawal operation for withdrawing said protrusion blocking plunger from said extended position to said retracted position in order to withdraw said protrusion blocking plunger from said receiving portion so as to allow protrusion of said lock shaft to said protruded position; and wherein said holding part comprises an engagement portion formed on said lock shaft and arranged to prevent said protrusion blocking plunger from being withdrawn from said blocking device receiving portion even upon activation of said electric safety motor to perform a plunger withdrawal operation for withdrawing said protrusion blocking plunger, to thereby prevent movement of said lock shaft from said retracted position to said protruded position due to an electrical malfunction.

2. The electrically-operated steering lock device according to claim 1, wherein said lock shaft moving device comprises a spring for biasing said lock shaft to a protruded position, and an electrically-operated member which is to be engaged with an engagement recessed portion formed in said lock shaft to move said lock shaft to the retracted position.

3. The electrically-operated steering lock device according to claim 1, wherein said electric safety motor of said protrusion blocking device comprises a solenoid.

4. The electrically-operated steering lock device according to claim 1, wherein said lock shaft moving device enables said lock shaft to move to the protruded position when the electric locking motor is rotated forward, and enables said lock shaft to move to the retracted position when the electric locking motor is rotated in reverse, and wherein, in a state that an engagement between said protrusion blocking device and said engagement portion has been released by reverse rotation of the electric locking motor, said lock shaft is allowed to protrude by forward rotation of the electric locking motor.

5. The electrically-operated steering lock device according to claim 1, wherein said receiving portion comprises a recess portion of said lock shaft, and said plunger has a flange portion that is extendable into said recess portion of said lock shaft to create the engagement of said protrusion blocking device with said receiving portion and that is engageable with said holding part to prevent retraction of said flange portion from said receiving portion.

6. An electrically-operated steering lock device for use in locking rotation of a steering shaft, said steering lock device comprising:

a lock shaft arranged to be movable between a protruded position in which the steering shaft is locked, and a retracted position in which the steering shaft is unlocked, said lock shaft having a blocking device receiving portion formed therein;

a lock shaft movement transmission arranged to be coupled to an electric locking motor and serving to move said lock shaft between the protruded and retracted positions upon operation of the electric locking motor;

an electrically operated protrusion blocking device that is engageable with and disengageable from said blocking device receiving portion, and that is operable, when said lock shaft is placed in said retracted position, to engage with said blocking device receiving portion so as to block protrusion of said lock shaft to said protruded position; and a holding part arranged to hold said protrusion blocking device in engagement with said blocking device receiving portion so as to prevent unintended disengagement of said protrusion blocking device from said blocking device receiving portion, and to thereby prevent unintended protrusion of said lock shaft from said retracted position to said protruded position;

wherein said protrusion blocking device comprises a protrusion blocking plunger movable between an extended position in which said plunger is engageable with said blocking device receiving portion and a retracted position in which said plunger is withdrawn from said blocking device receiving portion;

wherein said protrusion blocking device further comprising an electric safety motor which is operable, upon activation, to perform a plunger withdrawal operation for withdrawing said protrusion blocking plunger from said extended position to said retracted position in order to withdraw said protrusion blocking plunger from said blocking device receiving portion so as to allow protrusion of said lock shaft to said protruded position; and wherein said holding part comprises an engagement portion formed on said lock shaft and arranged to prevent said protrusion blocking plunger from being withdrawn from said blocking device receiving portion even upon activation of said electric safety motor to perform a plunger withdrawal operation for withdrawing said protrusion blocking plunger, to thereby prevent movement of said lock shaft from said retracted position to said protruded position due to an electrical malfunction.

7. The electrically-operated steering lock device according to claim 6, wherein said lock shaft moving transmission comprises a spring biasing said lock shaft toward the protruded position, and an electrically-operated member which is to be engaged with an engagement recessed portion formed in said lock shaft to move said lock shaft to the retracted position.

8. The electrically-operated steering lock device according to claim 6, wherein said electric safety motor comprises a solenoid.

9. The electrically-operated steering lock device according to claim 6, wherein said lock shaft moving device enables said lock shaft to move to the protruded position when the electric locking motor is rotated forward, and enables said lock shaft to move to the retracted position when the electric locking motor is rotated in reverse, and wherein, in a state that an engagement between said protrusion blocking device and said engagement portion has been released by reverse rotation of the electric locking motor, said lock shaft is allowed to protrude by forward rotation of the electric locking motor.

10. The electrically-operated steering lock device according to claim 6, wherein said blocking device receiving portion comprises a recess portion of said lock shaft, and said plunger has a flange portion that is extendable into said recess portion of said lock shaft to create the engagement of said protrusion blocking device with said blocking device receiving portion and that is engageable with said holding part to prevent retraction of said flange portion from said blocking device receiving portion.

* * * * *